(12) United States Patent
Tsai

(10) Patent No.: US 10,216,826 B2
(45) Date of Patent: Feb. 26, 2019

(54) DATABASE QUERY SYSTEM

(71) Applicant: Salesforce.com, Inc., San Francisco, CA (US)

(72) Inventor: Benjamin Tsai, San Francisco, CA (US)

(73) Assignee: Salesforce.com, Inc., San Francisco, CA (US)

( * ) Notice: Subject to any disclaimer, the term of this patent is extended or adjusted under 35 U.S.C. 154(b) by 768 days.

(21) Appl. No.: 14/842,207

(22) Filed: Sep. 1, 2015

(65) Prior Publication Data

US 2016/0063063 A1 Mar. 3, 2016

Related U.S. Application Data

(60) Provisional application No. 62/044,810, filed on Sep. 2, 2014.

(51) Int. Cl.
*G06F 17/30* (2006.01)

(52) U.S. Cl.
CPC .. *G06F 17/30595* (2013.01); *G06F 17/30327* (2013.01); *G06F 17/30427* (2013.01)

(58) Field of Classification Search
None
See application file for complete search history.

(56) References Cited

U.S. PATENT DOCUMENTS

| | | | |
|---|---|---|---|
| 5,386,556 A | 1/1995 | Hedin et al. | |
| 5,428,737 A | 6/1995 | Li et al. | |
| 5,721,904 A | 2/1998 | Ito et al. | |
| 5,809,505 A | 9/1998 | Lo et al. | |
| 6,356,892 B1 | 3/2002 | Corn et al. | |
| 6,993,475 B1 | 1/2006 | Mcconnell et al. | |
| 6,999,963 B1 | 2/2006 | Mcconnell et al. | |
| 7,310,642 B2 | 12/2007 | Mcconnell et al. | |
| 7,512,609 B2 | 3/2009 | Mcconnell et al. | |
| 7,640,254 B2 | 12/2009 | Mcconnell et al. | |
| 7,933,916 B2 | 4/2011 | Dolin et al. | |
| 8,819,046 B2 | 8/2014 | Warren et al. | |
| 8,972,433 B2 | 3/2015 | Mclean et al. | |
| 2004/0103100 A1* | 5/2004 | Levine | G06F 17/30286 |
| 2005/0149537 A1 | 7/2005 | Balin et al. | |
| 2005/0197828 A1 | 9/2005 | Mcconnell et al. | |
| 2005/0256888 A1 | 11/2005 | Mcconnell et al. | |

(Continued)

*Primary Examiner* — Anhtai V Tran

(74) *Attorney, Agent, or Firm* — Morris & Kamlay LLP

(57) ABSTRACT

A system and method for mapping a standard set of database query statements to a set of query statements for a target database, including a processor to receive an identification of a target database and identify any extension set of query statements of the target database, receive a plurality of standard database query statements, and map each standard database query statement to a query statement for the target database on the basis of an extension set associated with the target database. A statement mapping database may be created to map the query statements of the target database to the standard database query statements such that the processor may receive a standard database query statement and identify a corresponding query statement that is appropriate for the target database, and receive a query statement of the target database and identify a corresponding standard database query statement.

19 Claims, 3 Drawing Sheets

(56) References Cited

U.S. PATENT DOCUMENTS

| | | |
|---|---|---|
| 2005/0256889 A1 | 11/2005 | Mcconnell et al. |
| 2006/0074862 A1 | 4/2006 | Redburn et al. |
| 2006/0282447 A1 | 12/2006 | Hollebeek et al. |
| 2008/0215554 A1 | 9/2008 | Redburn et al. |
| 2008/0288474 A1* | 11/2008 | Chin ................. G06F 17/30669 |
| 2009/0177637 A1 | 7/2009 | Hollebeek et al. |
| 2009/0319496 A1 | 12/2009 | Warren et al. |
| 2011/0113054 A1 | 5/2011 | Mclean et al. |
| 2011/0125773 A1 | 5/2011 | Jin et al. |
| 2014/0244680 A1* | 8/2014 | Chandran ......... G06F 17/30427 707/760 |
| 2014/0280259 A1 | 9/2014 | Mcgillin et al. |

* cited by examiner

DATABASE QUERY SYSTEM

CROSS-REFERENCE TO RELATED APPLICATIONS

This application claims the benefit under 35 U.S.C. 119(e) of U.S. provisional patent application of Benjamin Tsai, entitled "Real Time Translation Of SQL In An Interactive Environment", Ser. No. 62/044,810, filed Sep. 2, 2014, the entire contents of said application being incorporated herein by reference.

BACKGROUND

Structured Query Language ("SQL") is a special-purpose programming language having a defined set of instructions that is useful for interacting with most relational database management systems ("RDBMS"), for example, to update or retrieve data from a database. SQL is a standard programming language as recognized by the American National Standards Institute ("ANSI") and the International Organization for Standardization ("ISO").

Despite its status as a standard programming language, the implementation of SQL code is not completely interchangeable among different database systems. Further, many different database system vendors do not strictly adhere to the standard, for example, by adding proprietary extensions in order to enhance the functionality of the standard SQL commands. This can create problems when a customer transitions from one database to another database.

BRIEF SUMMARY

According to implementations of the disclosed subject matter, a system and method is provided to map a standard set of database query statements to a set of query statements for a target database and using the mapping to automatically return appropriate query statements for one or more target databases based on standard query statements entered by a user.

An implementation of the disclosed subject matter also provides a processor and one or more stored sequences of instructions which, when executed by the processor, cause the processor to receive from a user or developer an identification of a target database.

An implementation of the disclosed subject matter also provides a processor and one or more stored sequences of instructions which, when executed by the processor, cause the processor to receive from a user or developer at least one standard database query statement.

In an implementation of the disclosed subject matter, a processor and one or more stored sequences of instructions are provided which, when executed by the processor, cause the processor to manage a relational or mapping database by, for example, mapping SQL statements written for a first database to SQL statements appropriate for a second database.

In an implementation of the disclosed subject matter, a processor and one or more stored sequences of instructions are provided for mapping SQL statements written for a first database to SQL statements appropriate for a second database which, when executed by the processor, cause the processor to parse and transform SQL statements written for a first database into an Abstract Syntax Tree (AST) representation, add properties and annotations associated with SQL statements appropriate for a second database, and unparse the AST into the SQL statements appropriate for a second database.

Accordingly, implementations of the disclosed subject matter provide a means for mapping a standard set of database query statements input by a user to a set of query statements for a target database by receiving an identification of the target database and identifying extension sets of statements of the target database, receiving at least one standard database query statement, and mapping each standard database query statement to a query statement for the target database, on the basis of an extension set associated with the target database.

Implementations of the disclosed subject matter also provide a system and method for mapping a standard set of database query statements input by a user to a set of query statements for a target database. The system may include a processor and one or more stored sequences of instructions which, when executed by the processor, cause the processor to receive an identification of the target database and identify query statements and extension sets of the target database, receive at least one standard database query statement, and map each standard database query statement to a query statement for the target database, on the basis of the extension set associated with the target database.

The system may include a processor to receive and store a plurality of standard database query statements in a relational or statement mapping database, receive an identification of a target database and identify and store query statements and extension sets associated with the target database in the statement mapping database, and map the query statements of the target database to the standard database query statements, on the basis of the extension set associated with the target database. The processor may then receive a standard database query statement from a user, and use the statement mapping database to identify and provide a corresponding query statement that is appropriate for the target database. In a similar manner, the processor may receive a query statement of the target database and use the statement mapping database to identify and provide a corresponding standard database query statement.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of the disclosed subject matter. No attempt is made to show structural details in more detail than may be necessary for a fundamental understanding of the disclosed subject matter and various ways in which it may be practiced.

DETAILED DESCRIPTION

Implementations of the disclosed subject matter can map a set of database query statements suitable for execution on one kind of database to a set of query statements that are suitable for execution on a different target database. This can occur for example, when a user wants to run a stored query formulated for a one kind of database on a different kind of target database.

For example, many different commercial database systems are readily available in the marketplace, some of which implement standard SQL. SQL is a high-level programming language used for Creating, Reading, Updating, and Deleting ("CRUD") records in most database systems. SQL defines a standard set of commands, including "SELECT", "INSERT", "UPDATE", "DELETE", "CREATE TABLE", "DROP TABLE", and so forth. However, many other commercial databases have incorporated proprietary extensions into the standard SQL architecture. For example, PL/SQL is one example of a procedural extension of SQL, offering features to enhance the basic SQL functionality. Other databases provide similar enhanced features with their own proprietary schemes. The use of extensions to the basic SQL functionality can create problems for users that use multiple databases, or that transition data storage from one kind of database to another database that may not have or support the same extensions.

In order to overcome this potential problem, implementations of the disclosed subject matter provide a system and method to create and manage data structures that are built to map database query statements executable on one kind of database to query statements for a different target database. For example, statements for execution on a standard SQL database can be mapped to a statements for a target database using a proprietary extension set. For a vendor's extension set of SQL statements, the system and method may be provided to create and manage a data structure such as a statement mapping database that maps the vendor's customized query statements to other query statements, such as standard SQL query statements, or map such standard SQL query statements to the vendor's customized query statements. Similar data structures can be built for other databases, such as those having different extension sets of SQL statements.

Figure 1:
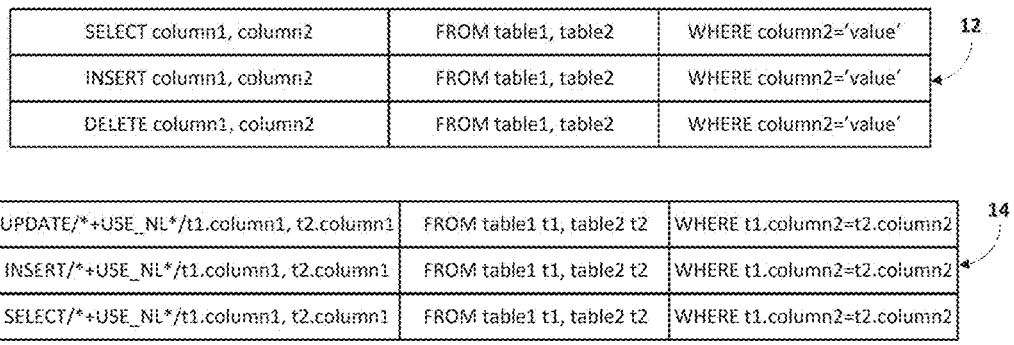
FIG. 1 shows an illustrative statement mapping database for mapping a standard set of database query statements to a set of query statements for a target database, according to an implementation of the disclosed subject matter.
Figure 2:
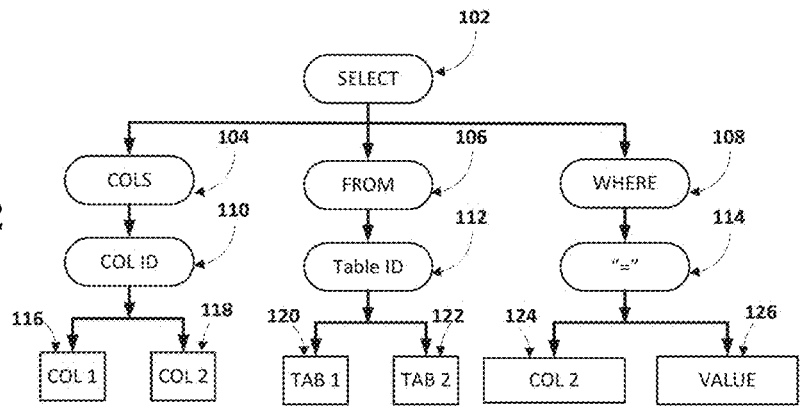
FIG. 2 shows an illustrative Abstract Syntax Tree (AST) data structure that may be used to represent the structure of a programming code, according to an implementation of the disclosed subject matter.

To do so, the system and method includes a statement mapping database to map standard SQL statements to SQL statements for the target database, such as those using a proprietary extension set. The statement mapping database may organize and store data in tables, including a plurality of standard database query statements, a plurality of query statements for the target database, and extension sets associated with the target database. The statement mapping database may further store data to map the standard database query statements to the set of statements for the target database. An example of a statement mapping database is shown in FIGS. 1 and 2.

In this case, the statement mapping database may describe a digital database whose organization is based on a relational model of data which organizes data into one or more tables (or "relations") of rows and columns. Each entity or database query statement type described in the statement mapping database may have its own table, where the rows of the table represent instances of that type of entity and the columns of the table represent values attributed to that instance. Because each row in a table can be uniquely identified, rows in a table can be linked to rows in other tables. The statement mapping database of FIGS. 1 and 2 may include a number of tables, each having a number of rows and columns where each row may represent a single record of a database query statement, and each column may represent a field in the record.

In an implementation of the disclosed subject matter, a processor of the system may execute one or more stored sequences of instructions which cause the processor to receive one or more database query statements from users or developers. The database query statements may be stored in a first database or table 12 of the statement mapping database, and may include standard SQL statements and any statement updates. As noted above, each table may have a number of rows and columns, where each row may represent a single record, and each column may represent a field in the record. The first table 12 includes three rows and three columns, and the first row illustrates a standard SQL statement to retrieve a data item for illustration purposes only, and implementations are not limited thereto.

The processor may then execute one or more stored sequences of instructions which cause the processor to receive an identification of a target database and in response, identify corresponding statements of the target database. The SQL statements of the target database, and extension sets associated with the SQL statements of the target database, may be stored in a second database or table 14 of the statement mapping database. For example, where proprietary SQL statements and extension sets associated with the SQL statements of the target database are publicly published, proposed as a standard, or the like, the published version of the proprietary SQL statements and extension sets associated with the SQL statements of the target database may be used to construct the table 14. As another example, where proprietary SQL statements and extension sets associated with the SQL statements of the target database set are maintained within a particular RDBMS or other product, sources such as user guides, developer code examples, or the like may be used to construct the table 14. As another example, in cases where proprietary SQL statements and extension sets associated with the SQL statements of the target database are provided as part of a proprietary or publicly published or available application programming interface (API), the API may be used to automatically generate entries for the table 14, or otherwise to construct an appropriate table 14. The second table 14 as shown in FIG. 1 includes three rows and three columns, and the third row illustrates an SQL statement of the target database to retrieve a data item for illustration purposes only, and implementations are not limited thereto.

The processor may then execute one or more stored sequences of instructions which cause the processor to parse and construct an Abstract Syntax Tree for one or more standard SQL statements of the statement mapping database that maps or correlates the proprietary SQL statements and extension sets associated with the SQL statements of the target database to the standard SQL statements. For example, to create the statement mapping database that maps standard SQL statements to SQL statements of the target database, the processor may receive standard SQL statements from a user, developer or other source, and parse and identify elements of each standard SQL statement. For example, a typical SQL SELECT statement retrieves records from a database table according to clauses (e.g., FROM and WHERE) that specify criteria. An example of a typical SQL SELECT statement that can be stored to table 12 is shown below.

SELECT column1, column2 FROM table1, table2 WHERE column2='value';

In the above standard SQL statement, the SELECT clause specifies one or more columns to be retrieved and the FROM clause specifies one or more tables to be queried. The WHERE clause selects only the rows in which the specified column contains the specified value enclosed in single quotes. The semicolon (;) is the statement terminator. The above example is provided for illustration purposes, and standard query language can be provided or identified using any number of sources including standardized SQL sources such as those outlined in "ANSI/ISO/IEC 9075:2003, "Database Language SQL", Parts 1 ("SQL/Framework"), 2 ("SQL/Foundation"), 3 ("SQL/CLI"), 4 ("SQL/PSM"), 9 ("SQL/MED"), 10 ("SQL/OLB"), 11 ("SQL/Schemata"), and 13 ("SQL/JRT"), and in ISO/IEC 9075:2003, "Database Language SQL", Parts 1 ("SQL/Framework"), 2 ("SQL/Foundation"), 3 ("SQL/CLI"), 4 ("SQL/PSM"), 9 ("SQL/MED"), 10 ("SQL/OLB") 11 ("SQL/Schemata"), and 13 ("SQL/JRT").

In a similar fashion, the processor may receive the SQL statements of the target database from a user, developer or other source, and parse and identify the elements of each statement to identify proprietary or unique extensions of query statements of the target database. For example, a PL/SQL SELECT statement can retrieve records from a database table but incorporates a proprietary extension into the standard SQL architecture that may not be compatible with other databases. Examples of typical PL/SQL SELECT statements that can be stored to table 14 are shown below.

SELECT/*+USE_NL*/t1.column1, t2.column1 FROM table1 t1, table2 t2 WHERE t1.column2=t2.column2;

SELECT t1.column1, t2.column1 FROM table1 t1, table2 t2 WHERE t1.column2=t2.column2(+);

In an implementation, the processor may parse the input SQL statement, such as those of table 12 and from which, generate target SQL statements for different databases, such as those of table 14. Parsing refers to breaking an artifact into its constituent elements and capturing the relationship between those elements. The parsing by the processor may first transform the input SQL into Abstract Syntax Tree (AST) representation and from which, generate the output statements. An AST representation is a tree representation of an abstract syntactic structure of the input SQL statement, written in programming language. Each node of the AST denotes a construct occurring in the source code.

However, in contrast to concrete syntax trees and the structure of the programming code, the data structure of the AST may not include every detail appearing in the real syntax of the input SQL statement. For example, the AST may not include punctuation and delimiters, such as braces, semicolons, parenthesis and so forth, found in the real syntax of the input SQL statement. The AST may also be edited to include properties and annotations for every element. Further, it is possible to unparse the AST into source code form that is similar to the original source code in appearance, and identical to the source code in execution.

FIG. 2 illustrates an AST data structure that may be used to represent the structure of a programming code, such as the SQL SELECT statement described above, and reproduced below.

SELECT column1, column2 FROM table1, table2 WHERE column2='value';

FIG. 2 illustrates parsing by the processor to transform the SQL SELECT statement into an AST representation. The processor may first parse the SQL SELECT statement into constructs occurring in the source code. In this example, the constructs may include "SELECT", "FROM" and "WHERE." The AST data structure of FIG. 2 illustrates a hierarchy of nodes that denote the constructs occurring in the source code of the SQL SELECT statement.

At a first level, node 102 may denote the "SELECT" construct. At a second level, node 104 extending from node 102 may denote "columns", node 106 also extending from node 102 may denote "FROM" and node 108 also extending from node 102 may denote "WHERE." At a third level, node 110 extending from node 104 may denote "column id", node 112 extending form node 106 may denote "table id" and node 114 extending from node 108 may denote "=." At a fourth level, nodes 116 and 118 denote "column1" and "column2", respectively, and nodes 120 and 122 denote "table1" and table2", respectively. Also on the fourth level, nodes 124 and 126 denote "column2" and "value", respectively. As illustrated in FIG. 2, the data structure of the AST may not include punctuation and delimiters, such as braces, semicolons, parenthesis and so forth, found in the real syntax of the input SQL statement.

Since the AST may include properties and annotations for every element or construct, those associated with the target SQL statements for different databases may be included in the AST. For example, properties and annotations associated with the target SQL statements for different databases may include parsed and identified proprietary or unique extension sets or other information. Further, since it is possible to unparse the AST into source code form that is similar to the original source code in appearance, and identical to the source code in execution, the processor may unparse the AST illustrated in FIG. 2. The processor may unparse the AST using the properties and annotations associated with the target SQL statements, into the target SQL statements for different databases, including proprietary extension sets. In doing so, the processor may provide a real time translation of relational queries and procedural statements in an interactive environment that shows target translations in real time with each keystroke.

The implementations of the disclosed subject matter create an interactive environment where users and developers can type in or otherwise enter standard SQL statements and have appropriate SQL statements for one or more target database environments returned. The users and developers can also type in SQL statements for one or more target database environments and have standard SQL statements returned. Since the processor may access table 12 and identify the SQL statement entered by the user, or access table 14 to identify the PL/SQL statement, the processor may also notify the user or developer of errors, duplications or other irregularities detected in the process, which may enable the user to re-type selected statements to eliminate the errors. For example, the AST may contain extra information about the position of an element in the source code. This information may be used to notify the user of the location of an error in the code.

According to another implementation of the disclosed subject matter, the user could also choose to display the results in real-time as input statements are mapped and corresponding statements returned, for example, in a "translation-as-typed" operation. This may enable the process to operate in real-time such as, for example, on a keystroke by keystroke basis where the system and method does not need to wait until the return key is depressed or other signal of the end of user input received, before it begins the process. Therefore, returned statements and feedback on the process are provided to the user in real-time as the user enters standard SQL statements or SQL statements of the target database. Further, the returned results could be provided or displayed in real-time for multiple target databases. In another implementation, both the standard SQL statement and SQL statement for the target database may be displayed to the user simultaneously on a device display.

Figure 3:
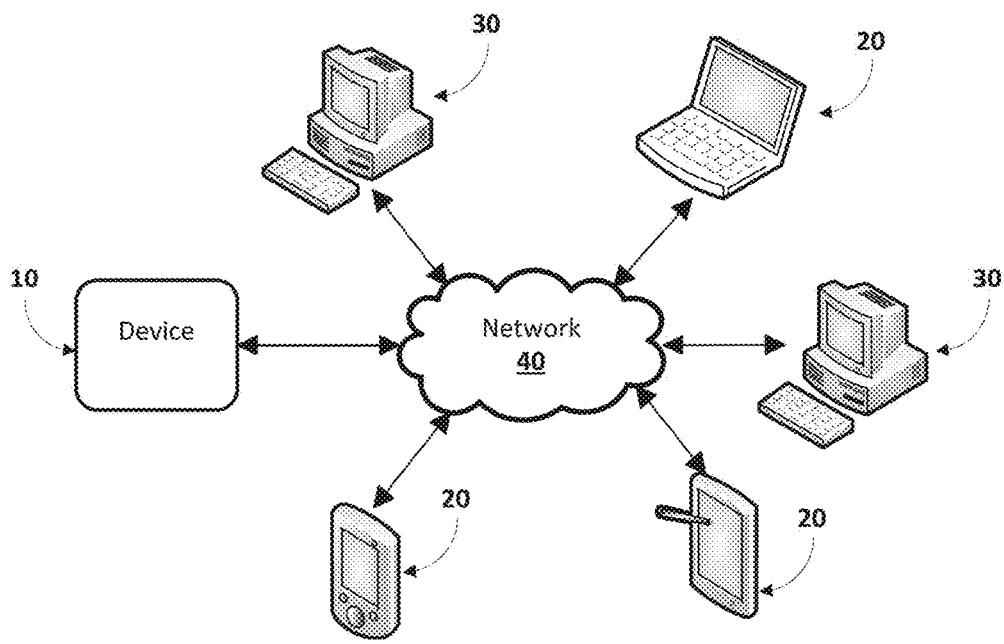
FIG. 3 shows an illustrative high-level overview of a system for mapping a standard set of database query statements to a set of query statements for a target database, according to an implementation of the disclosed subject matter.

FIG. 3 shows an illustrative high level overview of a system for mapping a standard set of database query statements to a set of statements for a target database, according to an implementation of the disclosed subject matter. The system of FIG. 3 may include a device 10, users 20, developers 30 and a network 40. The device 10, users 20, and developers 30 may be configured to communicate with one another via the network 40 and various types of electronic communication protocols including, but not limited to, Wi-Fi, general packet radio service (GPRS), global system for mobile communications (GSM), enhanced data rates for GSM evolution (EDGE), 3G, 4G, 4G long-term expansion (LTE), worldwide interoperability for microwave access (WiMAX), Ethernet, the Internet, and other wireless and wired electronic communication protocols.

Figure 4:
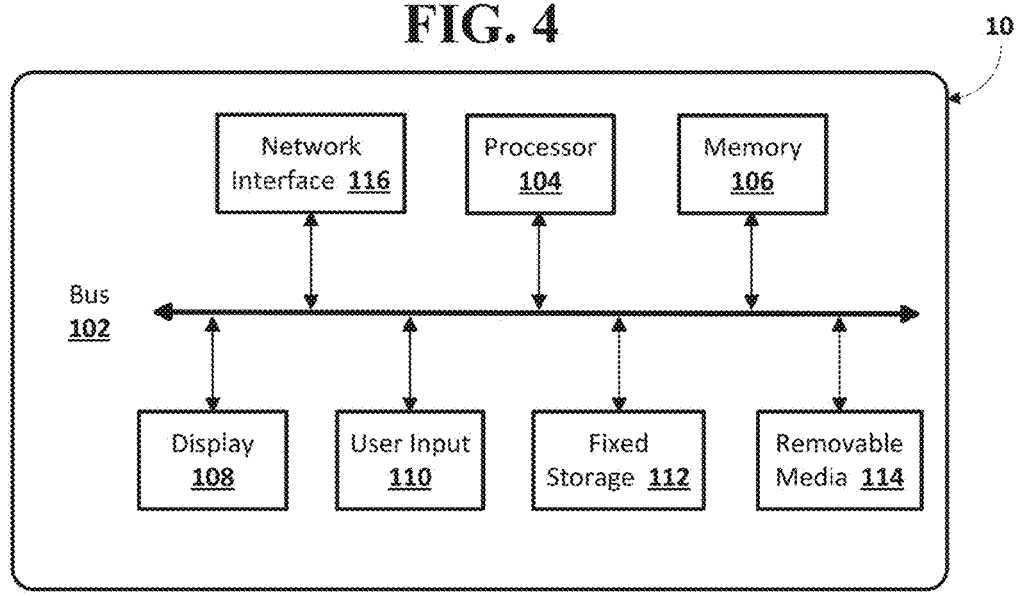
FIG. 4 shows an illustrative processor of FIG. 3 for mapping a set of database query statements usable on one kind of database to a set of query statements for a different target database, according to an implementation of the disclosed subject matter.

FIG. 4 shows an illustrative device 10 for handling a query targeted to a first database, when the query includes database query statements that are not executable on the target database. Rather, the statements may be executable on a different, second database. This can occur for example, when a user wants to run a stored query formulated for a second kind of database on a new, target database. The device 10 may be, for example, a desktop or laptop computer, or a mobile computing device such as a smart phone, tablet, or the like. The device 10 may include a bus 102 which interconnects major components of the device 10, such as a central processor 104, a memory 106 such as Random Access Memory (RAM), Read Only Memory (ROM), flash RAM, or the like, a user display 108 such as a display screen, a user input interface 110, which may include one or more controllers and associated user input devices such as a keyboard, mouse, touch screen, and the like, a fixed storage 112 such as a hard drive, flash storage, and the like, a removable media component 114 operative to control and receive an optical disk, flash drive, and the like, and a network interface 116 operable to communicate with one or more remote devices via a suitable network connection.

The bus 102 allows data communication between the central processor 104 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Stored sequences of instructions for execution by the processor 104 are generally stored on and accessed via a computer readable medium, such as a hard disk drive (e.g., fixed storage 112), an optical drive, floppy disk, or other storage medium.

The fixed storage 112 may be integral with the device 10 or may be separate and accessed through other interfaces. The network interface 116 may provide a direct connection to a remote server via a wired or wireless connection. The network interface 116 may provide such connection using any suitable technique and protocol as will be readily understood by one of skill in the art, including digital cellular telephone, WiFi, Bluetooth®, near-field, and the like. For example, the network interface 116 may allow the computer to communicate with other computers via one or more local, wide-area, or other communication networks.

Each device 10 may also include the statement mapping database as described above, which may be stored and accessed through, for example, the memory 106, and may be created to map standard SQL statements to SQL statements for the target database, such as those using a proprietary extension set. The statement mapping database may organize and store data in tables as described above, including a plurality of standard database query statements, a plurality of query statements for the target database, and extension sets associated with the target database. The statement mapping database may further store data and data structures to map the standard database query statements to the set of statements for the target database.

Figure 5:
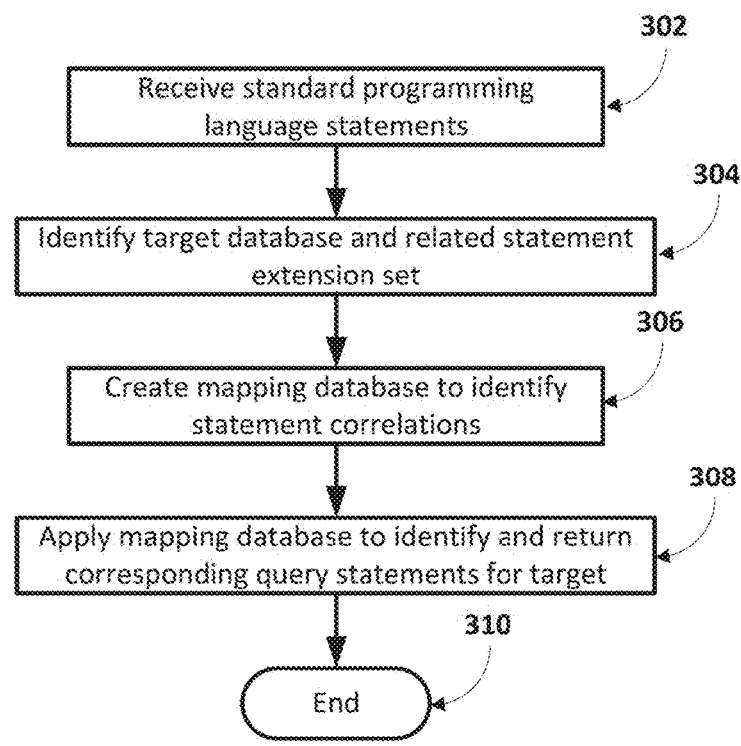
FIG. 5 shows an illustrative flow chart depicting operations for mapping a set of database query statements usable on one kind of database to a set of query statements for a different target database, according to an implementation of the disclosed subject matter.

FIG. 5 shows an illustrative flow chart depicting operations for mapping a standard set of database query statements to a set of query statements for a target database, according to an implementation of the disclosed subject matter. In step 302, the processor 104 may execute one or more stored sequences of instructions which cause the processor to receive one or more standard database query statements from users 20, developers 30 or other sources, and store the standard database query statements in the first database or table 12 of the statement mapping database. The standard database query statements may include standard SQL statements and any statement updates.

In step 304, the processor 104 may then execute one or more stored sequences of instructions which cause the processor to receive an identification of a target database and in response, identify SQL statements of the target database, and extension sets associated with the SQL statements of the target database. The SQL statements of the target database, and extension sets associated with the SQL statements of the target database, may be received from users 20, developers 30 or other sources, and stored in the second database or table 14 of the statement mapping database.

In step 306, the processor 104 may then execute one or more stored sequences of instructions which cause the processor to parse and construct an Abstract Syntax Tree for one or more standard SQL statements of the statement mapping database that maps or correlates the proprietary SQL statements and extension sets associated with the SQL statements of the target database to the standard SQL statements. To create the statement mapping database that maps standard SQL statements to SQL statements of the target database, the processor 104 may receive the standard SQL statements, receive the SQL statements of the target database, and parse and identify the elements of each, including the proprietary or unique extension set of SQL statements of the target database.

In step 308, properties and annotations associated with the target SQL statements may be included in the AST, and the processor 104 may unparse the AST into the target SQL statements, including proprietary extension sets, and return a corresponding query statement that is appropriate for the target database, ending the process at step 310.

The examples illustrating the use of technology disclosed herein should not be taken as limiting or preferred. These examples sufficiently illustrate the technology disclosed without being overly complicated, and are not intended to illustrate all of the technologies disclosed. A person having ordinary skill in the art will appreciate that there are many potential applications for one or more implementations of this disclosure.

Implementations of the disclosed subject matter described above may be provided with hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter.

Implementations may also be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing implementations of the disclosed subject matter. When implemented on a general-purpose microprocessor, the computer program code segments configure the microprocessor to create specific logic circuits.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A system for querying a database, comprising:
   a plurality of data records stored in a computer-readable medium;
   a statement mapping database storing a plurality of first database query statements executable on a first database and not on a second database, and a plurality of second database query statements executable on a second database and not the first database;
   a display;
   a processor; and
   one or more stored sequences of instructions which, when executed by the processor, cause the processor to:
      receive, from a user device, a user query for execution at the first database, the user query comprising at least one second database query statement;
      generate at least one first database query statement mapped to the at least one second database query statement received from the user by parsing the second database query statement and transforming the parsed second database query statement into a tree representation of the second database query statement, and generating the first database query statement from the tree representation of the second database query statement, wherein the processor further displays on the display in real-time with each keystroke portions of the first database query statement while the first database query statement is being determined by unparsing the tree representation of the second database query statement;
      receive from the statement mapping database the at least one first database query statement mapped to the at least one second database query statement received from the user; and
      execute the generated first database query statement within the first database.

2. The system of claim 1, wherein the processor is configured to form the statement mapping database by parsing the second database query statements and identifying statement constructs.

3. The system of claim 2, wherein the processor is further configured to form the statement mapping database by transforming the parsed second database query statement into an Abstract Syntax Tree (AST) representation.

4. The system of claim 3, wherein the processor is further configured to form the statement mapping database by adding data associated with the first database query statement in the AST and unparsing the AST into the first database query statement, and mapping the at least one second database query statement to the at least one first database query statement.

5. The system of claim 1, wherein the processor is configured to form the statement mapping database by parsing the first database query statements and identifying statement constructs.

6. A method for querying a database, the method comprising:
   receiving, from a user device, a user query for execution at a first database, the user query comprising at least one second database query statement;
   querying a statement mapping database to generate at least one first database query statement mapped to the at least one second database query statement received from the user by parsing the second database query statement and transforming the parsed second database query statement into a tree representation of the second database query statement, and generating the first database query statement from the tree representation of the second database query statement while displaying on a display in real-time with each keystroke while receiving the user query for execution at the first database portions of the first database query statement while the first database query statement is being determined by unparsing the tree representation of the second database query statement;

receiving from the statement mapping database the at least one first database query statement mapped to the at least one second database query statement received from the user; and executing the first query statement within the first database.

7. The method of claim 6, further comprising:

creating the statement mapping database, to store a plurality of first database query statements executable on a first database and not on a second database, and a plurality of second database query statements executable on a second database and not the first database.

8. The method of claim 7, wherein the step of creating the statement mapping database comprises:

parsing the second database query statements and identifying statement constructs.

9. The method of claim 8, wherein the step of creating the statement mapping database further comprises transforming the parsed second database query statement into an Abstract Syntax Tree (AST) representation.

10. The method of claim 9, wherein the step of creating the statement mapping database further comprises adding data associated with the first database query statement in the AST and unparsing the AST into the first database query statement, and mapping the at least one second database query statement to the at least one first database query statement.

11. The method of claim 7, wherein the step of creating the statement mapping database comprises:

parsing the first database query statements and identifying statement constructs.

12. The method of claim 6, further comprising displaying the first database query statement on a display in response to receipt of the second database query statement from the user.

13. The method of claim 12, wherein both the first database query statement and the second database query statement received from the user are displayed simultaneously on the display.

14. A non-transitory machine-readable medium carrying one or more sequences of instructions for querying a database, which instructions, when executed by one or more processors, cause the one or more processors to carry out the steps of:

receiving, from a user device, a user query for execution at a first database, the user query comprising at least one second database query statement;

querying a statement mapping database to generate at least one first database query statement mapped to the at least one second database query statement received from the user by parsing the second database query statement and transforming the parsed second database query statement into a tree representation of the second database query statement, and generating the first database query statement from the tree representation of the second database query statement while displaying on a display in real-time with each keystroke while receiving the user query for execution at the first database portions of the first database query statement while the first database query statement is being determined by unparsing the tree representation of the second database query statement;

receiving from the statement mapping database the at least one first database query statement mapped to the at least one second database query statement received from the user; and executing the first query statement within the first database.

15. The machine-readable medium of claim 14, further comprising instructions, when executed by one or more processors, cause the one or more processors to carry out the steps of:

creating the statement mapping database, to store a plurality of first database query statements executable on a first database and not on a second database, and a plurality of second database query statements executable on a second database and not the first database.

16. The machine-readable medium of claim 15, wherein the instructions for creating the statement mapping database cause the one or more processors to further carry out the steps of parsing the second database query statements and identifying statement constructs.

17. The machine-readable medium of claim 16, wherein the instructions for creating the statement mapping database cause the one or more processors to further carry out the steps of transforming the parsed second database query statement into an Abstract Syntax Tree (AST) representation.

18. The machine-readable medium of claim 17, wherein the instructions for creating the statement mapping database cause the one or more processors to further carry out the steps of adding data associated with the first database query statement in the AST and unparsing the AST into the first database query statement, and mapping the at least one second database query statement to the at least one first database query statement.

19. The machine-readable medium of claim 15, wherein the instructions for creating the statement mapping database cause the one or more processors to further carry out the steps of parsing the first database query statements and identifying statement constructs.

* * * * *